United States Patent Office 2,715,926
Patented Aug. 23, 1955

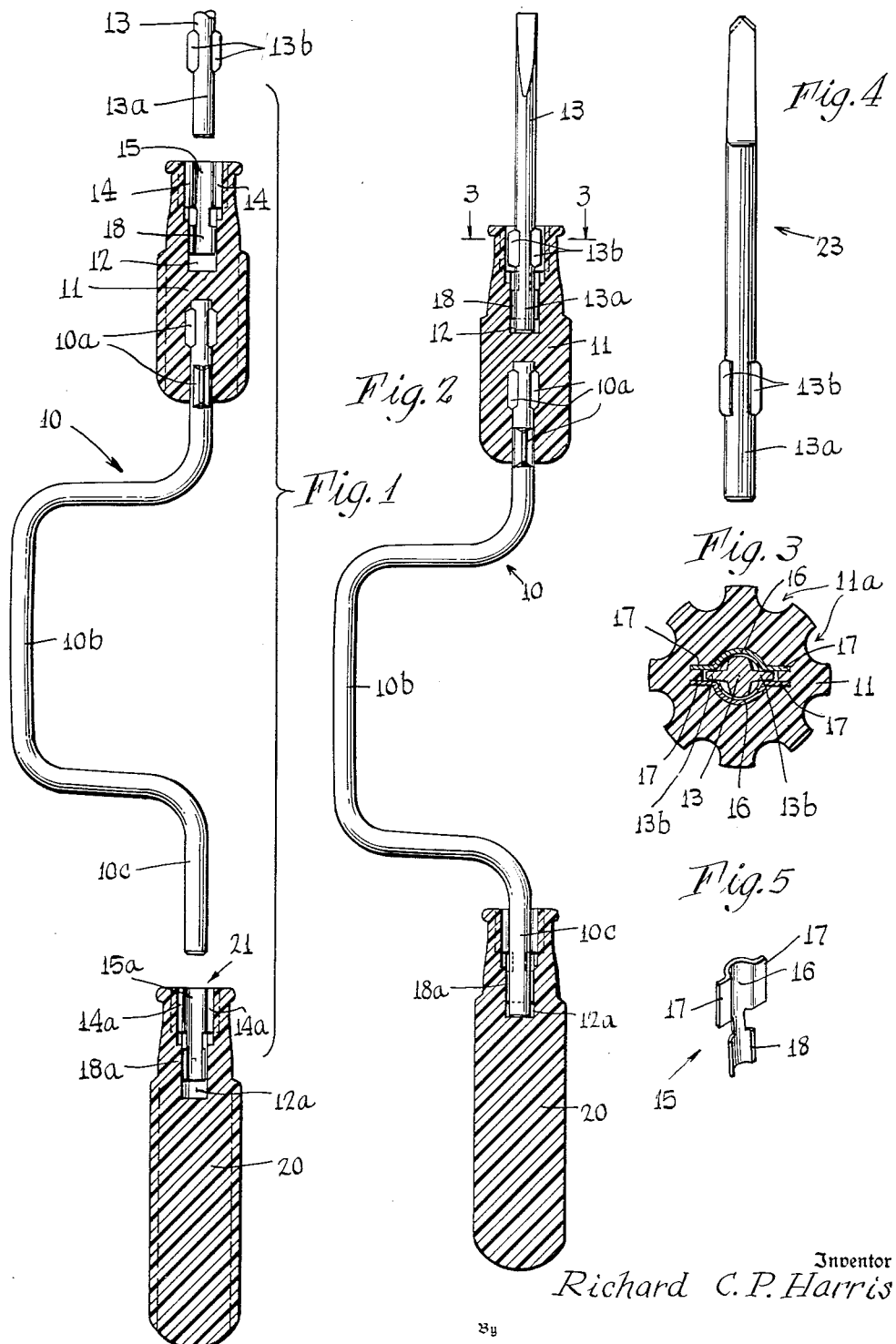
Aug. 23, 1955 — R. C. P. HARRIS — 2,715,926
COMBINATION BRACE TOOL
Filed Dec. 4, 1951
Inventor
Richard C. P. Harris
By Johnson and Kline
Attorneys

2,715,926

COMBINATION BRACE TOOL

Richard C. P. Harris, Rowayton, Conn., assignor to The Cornwall & Patterson Company, Bridgeport, Conn., a corporation of Connecticut Application December 4, 1951, Serial No. 259,749

4 Claims. (Cl. 145—66)

The present invention relates to a combination tool and to an attachment which is easily made, readily assembled and has great versatility.

Heretofore it has been the practice of providing a handle with a chuck to receive a plurality of interchangeable bits whereby the various types of tools, i. e., screw drivers of different sizes and types or cutting tools may be provided.

According to the present invention the use of such a handle has been extended to provide a brace which can receive the various bits heretofore inserted on the handle and form therewith a brace and bit.

This is accomplished by having a brace attachment for the handle which is provided with a tool receiving chuck at one end and which has a cylindrical extension adapted to rotatably fit into the handle chuck and be removably frictionally held therein by spring fingers in the chuck.

In accordance with the present invention, by having the handle chuck and attachment chuck of similar construction, the tools may be used interchangeably with the handle or with the brace as required.

Other features and advantages of the invention will be apparent from the specification and claims when considered in connection with the drawings wherein:

Figure 1 shows an exploded view of the brace.

Fig. 2 shows an assembled view of the brace with a screw driver bit in place.

Fig. 3 shows a section taken along line 3—3 of Fig. 2.

Fig. 4 shows a view of a cutting tool.

Fig. 5 shows a perspective of one of the liner members.

According to the present invention the brace attachment comprises a brace member 10 having a chuck body 11 at one end thereof. The body may be made of any suitable material such as wood, Bakelite or the like and is herein illustrated as being molded of a plastic material such as butyrate. The chuck body is drivingly secured to the end of the brace member by having the chuck body molded directly to the brace member with projecting wings 10a on the brace member insuring the driving connection between the two, or the body may be premolded and the end of the brace member inserted into a suitable socket therein.

The chuck body may or may not be provided with the usual ribbed or roughened exterior gripping surface 11a (Fig. 3) as desired. As shown in Figs. 1 and 2, the chuck body is formed at its forward end with a chuck comprising a socket 12 which extends into the body a depth to receive the chucking end of a bit 13 which may be a screw driver, as shown in Fig. 2, of various sizes or types or a cutting tool 23 as shown in Fig. 4 for drilling or the like operations. The bits 13 and 23 have at their chucking ends a cylindrical portion 13a and laterally projecting wings 13b.

Adjacent the mouth of the socket there are provided recesses 14 to provide an out of round section to cooperate with the complementary out of round section on the bit as provided by the projection or wings 13b.

The socket adjacent the mouth thereof is provided with a metal liner to protect the walls thereof against excess wear. In the herein illustrated form of the invention the liner is produced by means of two identical liner members 15, as shown in Fig. 5. These liner members can easily be stamped from strip material and being identical require only a single set of dies. Each comprises a curved central section 16 adapted to overlie the walls of the socket adjacent the mouth between the opposed recesses and is provided with extensions 17 which project outwardly and overlie the adjacent walls of the recesses with the ends of the extensions embedded in the body as shown in Fig. 3 and lock the members in place. The two members when positioned in face to face relation in the socket and recesses provide a reenforcement for the mouth of the socket of the recesses and prevent these surfaces from breaking down and rendering the device inoperative for its intended purpose by destroying the control of the tool at this point.

In order to insure that the blade of the bit is retained in the socket the members are provided with resilient means in the form of spring fingers 18 which project from the inner end thereof inwardly toward the axis of the socket and in spaced relation with the walls thereof to be engaged by the blade when it is put in position to frictionally grip the cylindrical end 13a of the bit and hold it in position. It is at present preferred to curve the fingers 18 to conform to the cylindrical portion of the bit as shown in Fig. 5 so that they will engage a large surface thereof.

Thus it will be seen that the brace chuck will releasably hold and satisfactorily drive the various bits inserted therein.

Intermediate the ends of the brace member is a lateral offset bent portion 10b which forms the hand-engaging part for rotating the brace. At the other end of the brace member there is a smooth cylindrical portion 10c in line with the chuck body 10 and adapted to be assembled with a handle 20 to form a brace.

The handle 20 may be made of any material and in a manner similar to the chuck body 11 of the brace attachment 10 and is provided with a chuck 21 at its inner end to rotatably receive the cylindrical portion 10c of the brace member. While the chuck may be of any construction suitable for this purpose, in the preferred form of the invention the chuck is formed in the same manner as the chuck in the chuck body 11 on the brace so that it has the socket 12a, the opposed recesses 14a, the liners 15a and the spring fingers 18a so that the chuck in the handle can receive and drive the bit 13 in the same manner as the chuck in member 11 when it is desired to use the same as a hand tool and can receive the end of the brace member when it is desired to use the handle as a part of the brace.

It will be noted that the cylindrical portion 10c has no wings to engage in the recesses 14a in the handle but does extend into engagement with the spring fingers 15a to be frictionally held thereby so that the handle and brace member will be maintained in assembled relation and yet the brace member can be rotated with respect to the handle merely by overcoming the friction of the spring fingers 15a.

It will be seen, therefore, that I have provided a novel combination tool which may be used with the same bits as a hand tool or with the brace attachment as a brace and bit, thus producing a tool of great versatility and one which has great utility as a household tool. This combination tool is one which can be readily manufactured and assembled and which has great versatility in its use. Further, by using the same construction in the brace and in the handle chuck the cost of manufacture can be kept to a minimum.

Variations and modifications may be made within the scope of the claims and portions of the improvements may be used without others.

I claim:

1. A brace comprising a handle having a chuck provided with a socket having spring friction fingers at the inner end thereof and tool driving recesses at the forward end and a brace member having a chuck similar to the handle chuck drivingly connected to the forward end thereof; and a smooth cylindrical portion at the rear end in line with the chuck and rotatably and removably mounted in the handle chuck and frictionally held therein by said friction fingers.

2. A brace comprising a handle having a chuck comprising a socket provided with spring friction fingers at the inner end thereof and a brace member having a chuck member drivingly connected to the forward end thereof, said chuck member having a bit-receiving and driving socket at the forward end and friction means in said socket for gripping the end of the bit to hold the bit in said socket; an offset hand-engaging portion intermediate the ends thereof; and a smooth cylindrical portion at the rear end in line with the chuck end rotatably and removably mounted in the socket in the handle and frictionally held therein by said friction fingers.

3. A brace attachment for a handle having a chuck provided with spring friction fingers at the inner end thereof comprising a member having a chuck body fixed to the forward end thereof, said chuck member having a socket therein provided with spaced spring friction fingers at the inner end and tool driving recesses at the forward end thereof, said member having an offset hand-engaging portion intermediate the ends thereof; and a smooth cylindrical portion at the rear end in line with the chuck member to be rotatably and removably mounted in the handle chuck and frictionally held therein by said friction fingers.

4. A brace comprising a handle having a tool-receiving chuck at the forward end; and a brace member rotatably carried by said handle, said brace member having front and rear aligned portions connected by a substantially U-shaped hand grip section, said front portion having a tool-engaging chuck thereon and said rear portion being adapted to be inserted into said handle chuck to connect the brace to the handle, said chucks being similar whereby a tool having a chuck-engaging portion can be mounted in the brace chuck or handle chuck, when the brace is removed, to be driven thereby.

References Cited in the file of this patent

UNITED STATES PATENTS

| | | |
|---|---|---|
| 112,799 | French | Mar. 21, 1871 |
| 392,062 | Pedersen | Oct. 30, 1888 |
| 772,593 | Wagner | Oct. 18, 1904 |
| 876,718 | Kampee | Jan. 14, 1908 |
| 1,478,736 | Gadberry | Dec. 25, 1923 |
| 1,537,657 | Burch | May 12, 1925 |
| 2,378,775 | Johnson | June 19, 1945 |
| 2,476,762 | Petre et al. | July 19, 1949 |
| 2,527,492 | Cleary et al. | Oct. 24, 1950 |

FOREIGN PATENTS

| | | |
|---|---|---|
| 479,966 | Great Britain | Feb. 15, 1938 |